US012679551B2

(12) United States Patent     (10) Patent No.:     US 12,679,551 B2

Tsutsumi et al.     (45) Date of Patent:        Jul. 14, 2026

(54) CONTROL DEVICE, MOVING OBJECT, AND CONTROL METHOD

(71) Applicant: HONDA MOTOR CO., LTD., Tokyo (JP)

(72) Inventors: Daiko Tsutsumi, Wako (JP); Akinori Kita, Wako (JP); Minato Nakano, Wako (JP); Koji Hosono, Wako (JP)

(73) Assignee: HONDA MOTOR CO., LTD., Tokyo (JP)

( * ) Notice:     Subject to any disclaimer, the term of this patent is extended or adjusted under 35 U.S.C. 154(b) by 168 days.

(21) Appl. No.: 18/619,842

(22) Filed:     Mar. 28, 2024

(65)     Prior Publication Data

US 2024/0327015 A1     Oct. 3, 2024

(30)     Foreign Application Priority Data

Mar. 31, 2023     (JP) ................................. 2023-059648

(51) Int. Cl.
B64D 31/16     (2024.01)
B60L 15/20     (2006.01)
B64D 27/357     (2024.01)

(52) U.S. Cl.
CPC .............. B64D 31/16 (2024.01); B60L 15/20 (2013.01); B64D 27/357 (2024.01); *B60L 2200/10* (2013.01)

(58) Field of Classification Search
CPC ....... B64D 31/16; B64D 27/357; B60L 15/20; B60L 2200/10; B60L 50/13; B60L 50/61;
B60L 58/14; B60L 58/21; B60L 2220/42; H02J 7/00306; H02J 7/0068; H02J 7/00712; H02J 7/1415; H02J 7/34
See application file for complete search history.

(56)     References Cited

U.S. PATENT DOCUMENTS

| | | | | |
|---|---|---|---|---|
| 2005/0035740 A1* | 2/2005 | Elder | .................. | H01M 10/122 320/116 |
| 2006/0247829 A1* | 11/2006 | Sato | ........................ | B60L 58/10 701/22 |
| 2014/0101476 A1* | 4/2014 | Lu | ......................... | G06F 1/3212 713/340 |
| 2015/0073614 A1* | 3/2015 | Yoshida | ................ | H02J 7/0068 307/22 |
| 2016/0214737 A1* | 7/2016 | Radun | ..................... | H02J 7/345 |
| 2020/0148374 A1 | 5/2020 | Kawai | | |
| 2021/0188121 A1* | 6/2021 | Kikuchi | .................. | B60L 58/10 |
| 2021/0370786 A1* | 12/2021 | Vinson | .................... | B60L 53/24 |
| 2022/0173601 A1* | 6/2022 | Lohe | ......................... | H02J 7/80 |

(Continued)

FOREIGN PATENT DOCUMENTS

JP     2020-075649 A     5/2020

*Primary Examiner* — Donald J Wallace
*Assistant Examiner* — Jalal C Coduroglu
(74) *Attorney, Agent, or Firm* — Rankin, Hill & Clark LLP

(57)     ABSTRACT

A control device includes an acquisition unit configured to acquire information indicating a battery output limit value that is a maximum value of electric power that can be supplied from a battery to an electric load, and a control unit configured to, when electric power supplied from a first battery to a first electric load is expected to exceed a first battery output limit value, execute control of increasing electric power supplied from a battery other than the first battery and reducing electric power supplied from the first battery to the first electric load.

6 Claims, 13 Drawing Sheets

(56)         References Cited

U.S. PATENT DOCUMENTS

| 2022/0297571 A1* | 9/2022 | Oguma | ................... B60L 50/40 |
| 2023/0066433 A1* | 3/2023 | Wiegman | ................ B60L 58/26 |
| 2023/0134808 A1* | 5/2023 | Wiegman | ............. B60L 3/0046 |
| | | | 320/109 |

* cited by examiner

ELECTRIC POWER

CONTROL DEVICE, MOVING OBJECT, AND CONTROL METHOD

CROSS-REFERENCE TO RELATED APPLICATIONS

This application is based upon and claims the benefit of priority from Japanese Patent Application No. 2023-059648 filed on Mar. 31, 2023, the contents of which are incorporated herein by reference.

BACKGROUND OF THE INVENTION

Field of the Invention

The present invention relates to a control device, a moving object, and a control method.

Description of the Related Art

JP 2020-075649 A discloses that when a battery is charged to an upper limit of its SOC (State Of Charge), power generation by a gas turbine is stopped, and electric power is supplied using only the battery to generate a thrust of a flying object.

SUMMARY OF THE INVENTION

However, in the case of JP 2020-075649 A, the battery outputs power in accordance with power requested by the flying object, and as a result, over-discharge may be caused. Further, even if charging of the battery and supply of electric power to the electric motor are performed by power generation by the gas turbine after the charge amount of the battery has become close to the SOC lower limit, it is necessary to restart or increase the output of the gas turbine in consideration of the delay in response of the gas turbine. In such a case, it is necessary to output the power of the gas turbine earlier, which may lower the fuel economy of the moving object.

An object of the present invention is to solve the above-mentioned problem.

A first aspect of the present invention is characterized by a control device for controlling a moving object provided with a plurality of electric power systems that supply electric power to a plurality of electric loads including at least one motor that drives a thrust device that generates thrust for the moving object, wherein the plurality of electric power systems include batteries respectively, and the plurality of electric power systems include a first electric power system, the first electric power system including a first battery which is one of the batteries, the first battery being configured to supply electric power to a first electric load including the motor that belongs to a first group, the first electric load being one of the electric loads, the control device including an acquisition unit configured to acquire information indicating a battery output limit value that is a maximum value of electric power that can be supplied from each of the batteries to the electric loads; and a control unit configured to, when electric power supplied from the first battery to the first electric load is expected to exceed a first battery output limit value which is the battery output limit value of the first battery, execute control of increasing electric power supplied from a battery, of the batteries, other than the first battery to an electric load, of the electric loads, other than the first electric load, within a range not exceeding the battery output limit value of the battery other than the first battery, and reducing the electric power supplied from the first battery to the first electric load.

A second aspect of the present invention is characterized by a moving object including the control device according to the first aspect.

A third aspect of the present invention is characterized by a control method for controlling a moving object provided with a plurality of electric power systems that supply electric power to a plurality of electric loads including at least one motor that drives a thrust device that generates thrust for the moving object, wherein the plurality of electric power systems including batteries respectively, and the plurality of electric power systems include a first electric power system, the first electric power system including a first battery, which is one of the batteries, the first battery being configured to supply electric power to a first electric load including the motor that belongs to a first group, the first electric load being one of the electric loads, the control method including: acquiring information indicating a battery output limit value that is a maximum value of electric power that can be supplied from each of the batteries to the electric loads; and when electric power supplied from the first battery to the first electric load is expected to exceed a first battery output limit value, which is the battery output limit value of the first battery, executing control of increasing electric power supplied from a battery, of the batteries, other than the first battery to an electric load, of the electric loads, other than the first electric load, within a range not exceeding the battery output limit value of the battery other than the first battery, and reducing the electric power supplied from the first battery to the first electric load.

According to the present invention, a control device, a moving object, and a control method capable of performing electric power control in a favorable manner are provided.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 10 is a graph schematically showing another example of the magnitude of electric power that can be output from each of the plurality of electric power systems after the power allocation change control is performed;

FIG. 11 is a graph schematically showing another example of the magnitude of electric power that can be output from each of the plurality of electric power systems according to a modification;

FIG. 12 is a graph schematically showing another example of the magnitude of electric power that can be output from each of the plurality of electric power systems according to a modification; and FIG. 13 is a graph schematically showing another example of the magnitude of electric power that can be output from each of the plurality of electric power systems according to a modification.

DETAILED DESCRIPTION OF THE INVENTION

A moving object may include a thrust device and a motor. The thrust device is a device that generates thrust in a moving object. The thrust device may be driven by a motor. The motor is driven by using electric power supplied from a power generation device provided in the moving object, for example. When electric power required by the moving object is larger than electric power generated by the power generation device, for example, electric power supplied from a battery provided in the moving object is used. When the power of the battery is used, the remaining battery level decreases. Further, when the battery is caused to output excessive electric power, the battery may be brought into an over-discharge state, and the battery may be damaged.

Embodiment

Figure 1:
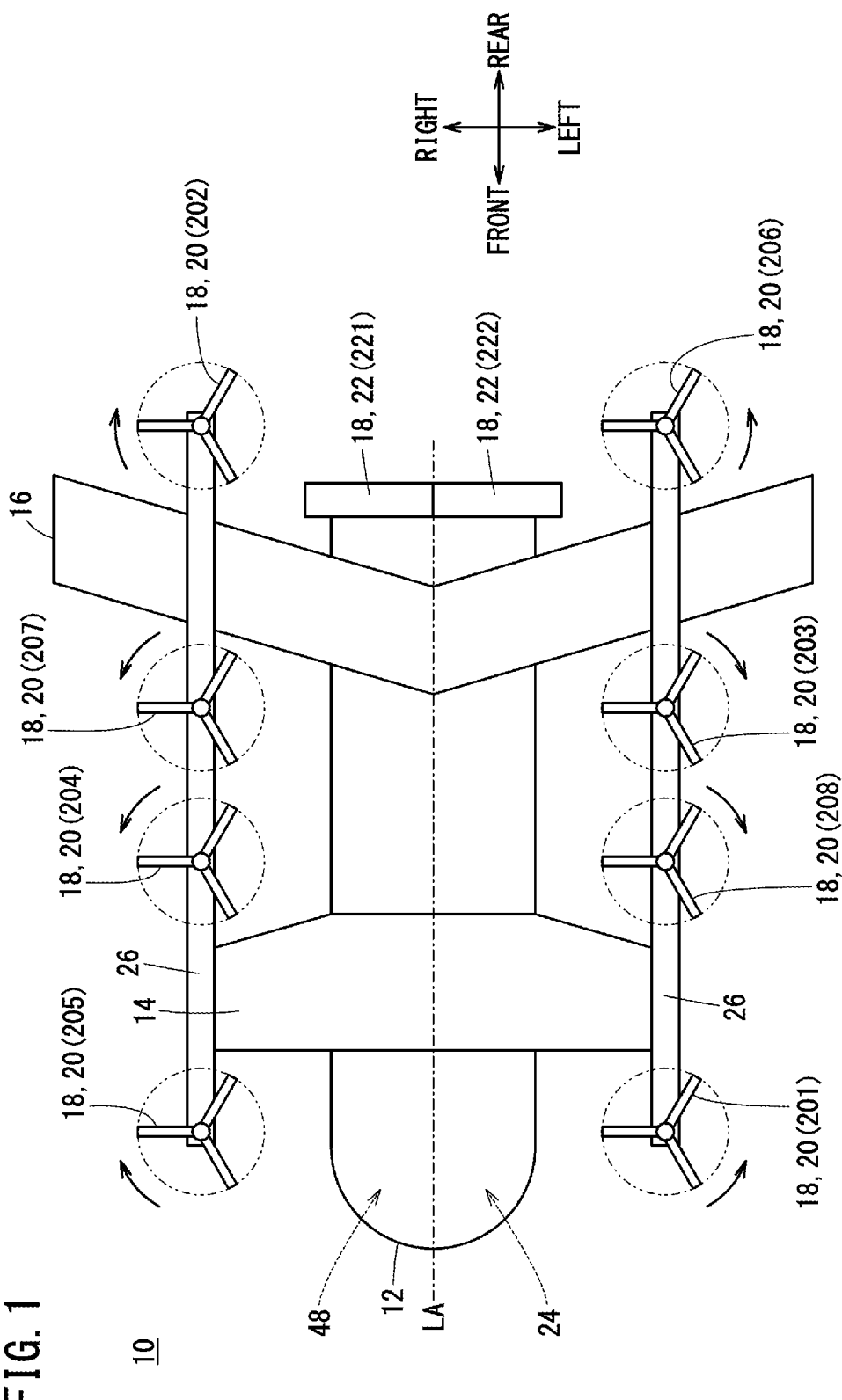
FIG. 1 is a schematic view of a moving object according to an embodiment.

FIG. 1 is a schematic view of a moving object 10 according to the present embodiment.

The moving object 10 is, for example, a vehicle that moves with a person therein. In the present embodiment, a case where the moving object 10 is an eVTOL (electronic vertical take-off and landing aircraft) will be described, but the present invention is not limited thereto.

The moving object 10 includes a fuselage (body) 12, a front wing 14, and a rear wing 16. The moving object 10 further includes an electric power system 24, a control device 48, and the like, which will be described later.

A cockpit, a cabin, and the like, none of which are shown, are provided in the fuselage 12. The cockpit is boarded by a pilot. The cabin is boarded by passengers and the like.

Each of the front wing 14 and the rear wing 16 is a fixed wing attached to the fuselage 12. The front wing 14 is positioned forward of the rear wing 16. The fixed wing generates lift in accordance with the forward movement of the fuselage 12.

The moving object 10 further includes a plurality of rotors 18. Each of the plurality of rotors 18 is an electric rotor (thrust device). The plurality of rotors 18 include a plurality of lift rotors 20 (201 to 208) and a plurality of cruise rotors 22 (221, 222).

The lift rotor 20 is a thrust device for generating thrust along the vertical direction. That is, the lift rotor 20 is a thrust device for generating lift. The plurality of lift rotors 20 are arranged in line symmetry with respect to a center line LA of the fuselage 12 extending in the front-rear direction. The plurality of lift rotors 20 are installed on, for example, a pair of left and right booms 26 provided on the fuselage 12. The moving object 10 can be levitated in the vertical direction by the lift generated by the lift rotors 20. Although the number of the lift rotors 20 shown in FIG. 1 is eight, the number of the lift rotors 20 that can be provided in the moving object 10 is not limited to this.

The cruise rotor 22 is a thrust device for generating thrust along the horizontal direction. The moving object 10 can move forward by the thrust generated by the cruise rotors 22. The cruise rotor 22 is mounted, for example, on the rear portion of the fuselage 12. Although the number of the cruise rotors 22 shown in FIG. 1 is two, the number of the cruise rotors 22 that can be provided in the moving object 10 is not limited to this.

Figure 2:
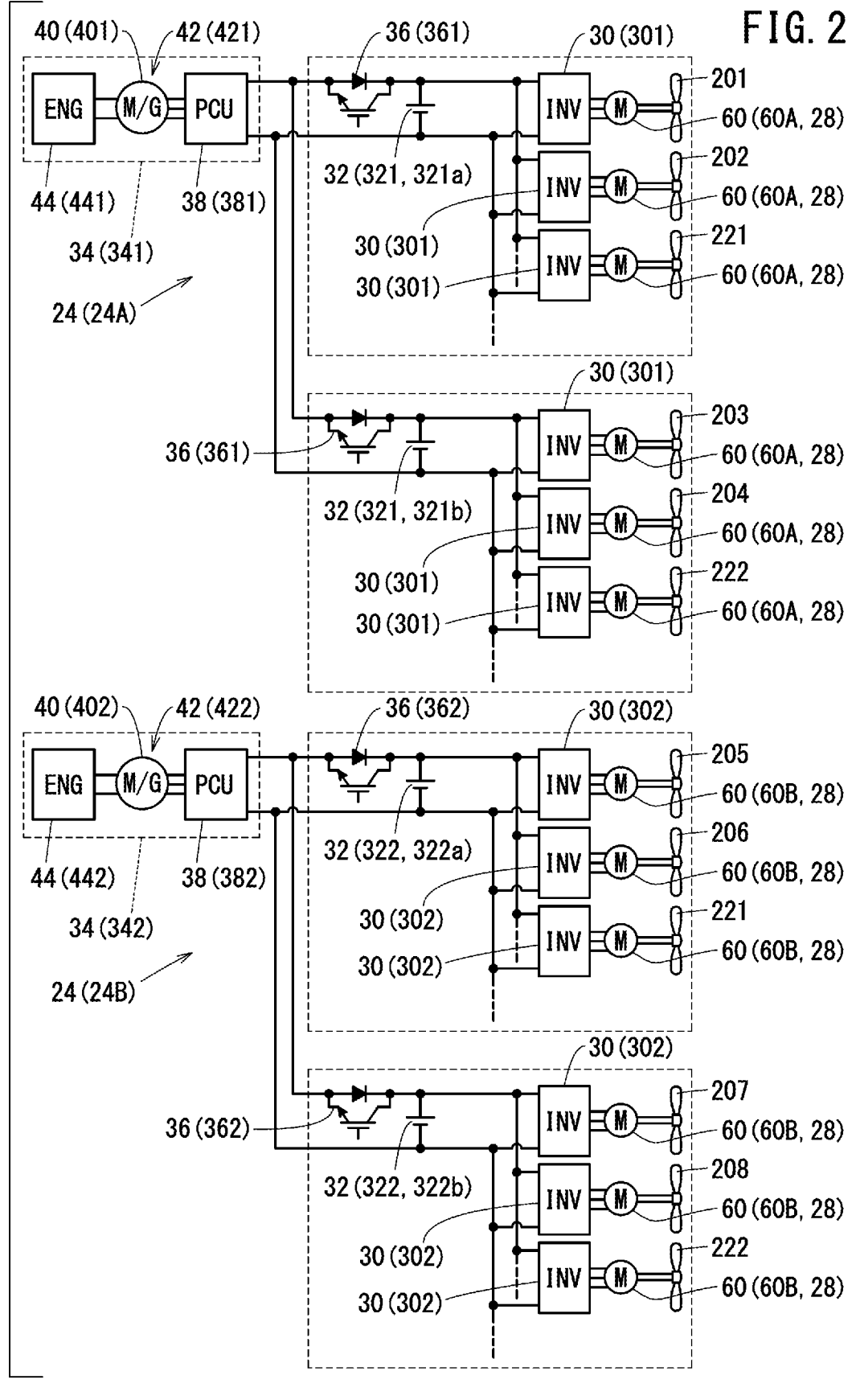
FIG. 2 is a schematic diagram showing an electric power system.

FIG. 2 is a schematic diagram showing the electric power system 24. The plurality of rotors 18 described above are driven by using electric power supplied from the plurality of electric power systems 24. When the individual electric power systems are described separately, reference signs 24A and 24B are used, and when the individual electric power systems are described without being distinguished, reference sign 24 is used. The plurality of electric power systems 24 are provided in the moving object 10.

The plurality of electric power systems 24 include a first electric power system 24A and a second electric power system 24B. Each of the first electric power system 24A and the second electric power system 24B supplies electric power to an electric load 28 provided in the moving object 10. Each of a plurality of rotor electric motors (motors) 60 described later corresponds to the electric load 28, but the electric load 28 is not limited to this. A cooling system, an electronic control unit (ECU), and the like included in the moving object 10 also correspond to the electric load 28.

The first electric power system 24A includes a plurality of inverters 30 (301), two batteries 32 (321), a power generation module 34 (341), and switches 36 (361). The first electric power system 24A is provided with two switches 361. In the following description, the battery 321 is also referred to as a first battery 321.

The lift rotor 201, the lift rotor 202, and the cruise rotor 221 described above are driven by different rotor electric motors 60 (60A). These rotor electric motors 60A are driven by different inverters 301. Electric power from one (battery 321a) of the two batteries 321 is supplied to these inverters 301.

The lift rotor 203, the lift rotor 204, and the cruise rotor 222 described above are driven by different rotor electric motors 60A. These rotor electric motors 60A are driven by different inverters 301. Electric power from the other (battery 321b) of the two batteries 321 is supplied to these inverters 301.

The inverter 301 converts direct-current power (DC power) input to the inverter 301 into alternating-current power (AC power). The inverter 301 also supply AC power obtained by converting DC power, to the rotor electric motor 60A. Thus, the rotor electric motor 60A is driven. Note that DC power output from the battery 321, a PCU 381, or the like is input to the inverters 301.

In the following description, a group including a plurality of electric loads (first electric loads) 28 to which electric power is supplied from the first electric power system 24A is also referred to as a first group. Each of the plurality of above-described rotor electric motors 60A is a first electric load (28) belonging to the first group.

The power generation module 341 includes a PCU 38 (381), a power generator 40 (401), and an internal combustion engine 44 (441). The PCU 38 is a power control unit. The plurality of batteries 321 are connected to the PCU 381 via mutually different switches 361. The power generator 401 is connected to the two batteries 321 via the PCU 381. The internal combustion engine 441 is connected to the PCU 381 via the power generator 401.

Each of the two switches 361 includes a switching element, a diode, and the like. One of the two switches 361 is interposed between one of the two batteries 321 and the PCU 381. The other of the two switches 361 is interposed between the other of the two batteries 321 and the PCU 381. When the switch 361 is in an ON state, supply of electric power from the battery 321 corresponding to that switch 361 to the power generator 401 is permitted. When the switch 361 is in an OFF state, supply of electric power from the battery 321 corresponding to that switch 361 to the power generator 401 is not permitted.

The internal combustion engine 441, for example, is a gas turbine engine. The internal combustion engine 441 is provided with a rotation shaft (output shaft) (not shown). The rotation shaft is connected to the power generator 401.

The power generator 401 includes, for example, a motor generator. The power generator 401 performs motoring of the internal combustion engine 441 by using electric power supplied from the battery 321. That is, the power generator 401 functions as a starting mechanism 42 (421) that starts the internal combustion engine 441 by being supplied with electric power from the battery 321.

The power generator 40 doubles as the starting mechanism 42 because the number of components provided in the moving object 10 can be reduced as compared with a case where the starting mechanism and the power generator are separately provided. As a result, an increase in the weight of the moving object 10 is suppressed, and thus the fuel efficiency of the moving object 10 can be improved.

After the internal combustion engine 441 is started, the internal combustion engine 441 drives the power generator 401. The power generator 401 driven by the internal combustion engine 441 can supply electric power to the plurality of electric loads 28 via the PCU 381. The power generator 401 driven by the internal combustion engine 441 can supply electric power for charging, to the battery 321 via the PCU 381. Supply of power from the power generator 401 to the electric load 28, the battery 321, and the like is permitted regardless of ON/OFF state of the switch 361.

Electric power output from the power generator 401 is AC power. Therefore, AC power is input to the PCU 381 from the power generator 401.

The PCU 381 includes an inverter, a converter, and the like (not shown). The PCU 381 converts AC power output by the power generator 40 into DC power. As a result, as described above, DC power is supplied to the battery 321, the inverter 301, and the like.

The second electric power system 24B basically has the same configuration as the first electric power system 24A. Therefore, the description of the same elements as those of the first electric power system 24A will be omitted as appropriate.

The second electric power system 24B includes a plurality of inverters 30 (302), two batteries 32 (322), a power generation module 34 (342), and two switches 36 (362). The power generation module 342 includes a PCU 38 (382), a power generator 40 (402), and an internal combustion engine 44 (442). The power generator 402 doubles as the starting mechanism 42 (422) for starting the internal combustion engine 442. In the following description, the battery 322 is also referred to as a second battery 322.

The lift rotor 205, the lift rotor 206, and the cruise rotor 221 described above are driven by different rotor electric motors 60 (60B). These rotor electric motors 60B are driven by different inverters 302. Electric power from one (battery 322a) of the two batteries 322 is supplied to these inverters 302.

The lift rotor 207, the lift rotor 208, and the cruise rotor 222 described above are driven by different rotor electric motors 60B. These rotor electric motors 60B are driven by different inverters 302. Electric power from the other (battery 322b) of the two batteries 322 is supplied to these inverters 302.

In the following description, a group including a plurality of electric loads (second electric loads) 28 to which electric power is supplied from the second electric power system 24B is also referred to as a second group. Each of the plurality of above-described rotor electric motors 60B is a second electric load (28) belonging to the second group.

DC power from the battery 322, the PCU 382, or the like is input to the inverters 302. The inverter 302 converts the DC power input to the inverter 302, into AC power. The inverters 302 also supply AC power obtained by converting DC power, to the rotor electric motor 60B. Thus, the rotor electric motor 60B is driven.

According to the electric power system 24 shown in FIG. 2, one lift rotor 20 of any two lift rotors 20 adjacent to each other in the front-rear direction is connected to the first electric power system 24A, and the other lift rotor 20 is connected to the second electric power system 24B (see also FIG. 1). One lift rotor 20 of any two lift rotors 20 adjacent to each other in the left-right direction is connected to the first electric power system 24A, and the other lift rotor 20 is connected to the second electric power system 24B. In this way, even if one of the first electric power system 24A and the second electric power system 24B fails, the attitude of the moving object 10 can be easily stabilized.

According to the electric power system 24 shown in FIG. 2, each of the plurality of cruise rotors 22 is connected to both the first electric power system 24A and the second electric power system 24B. In this way, even if one of the first electric power system 24A and the second electric power system 24B fails, both of the plurality of cruise rotors 22 can be continuously driven.

Figure 3:
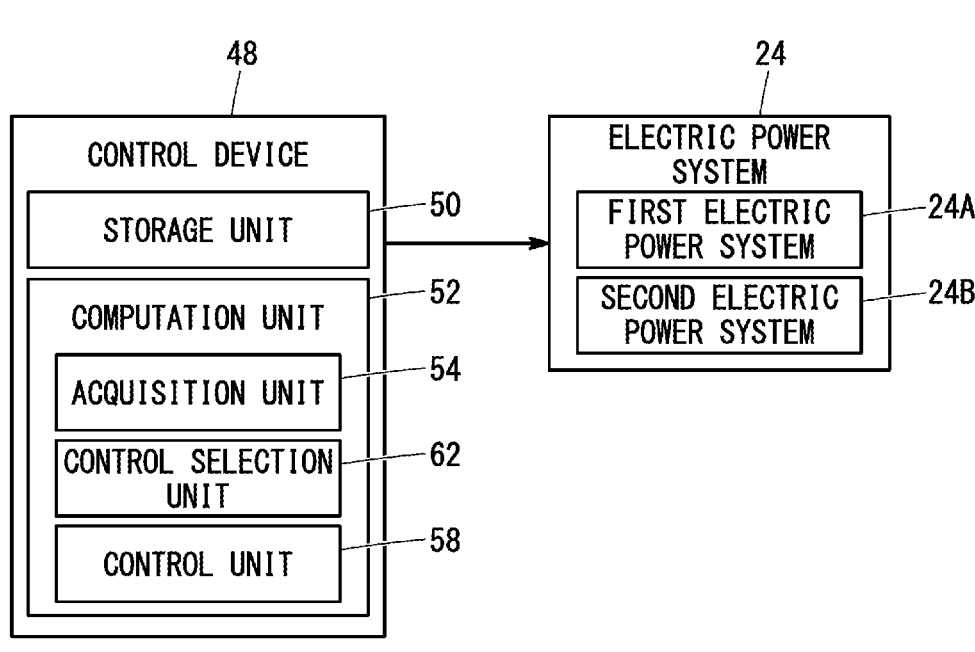
FIG. 3 is a block diagram showing a control device.
Figure 4:
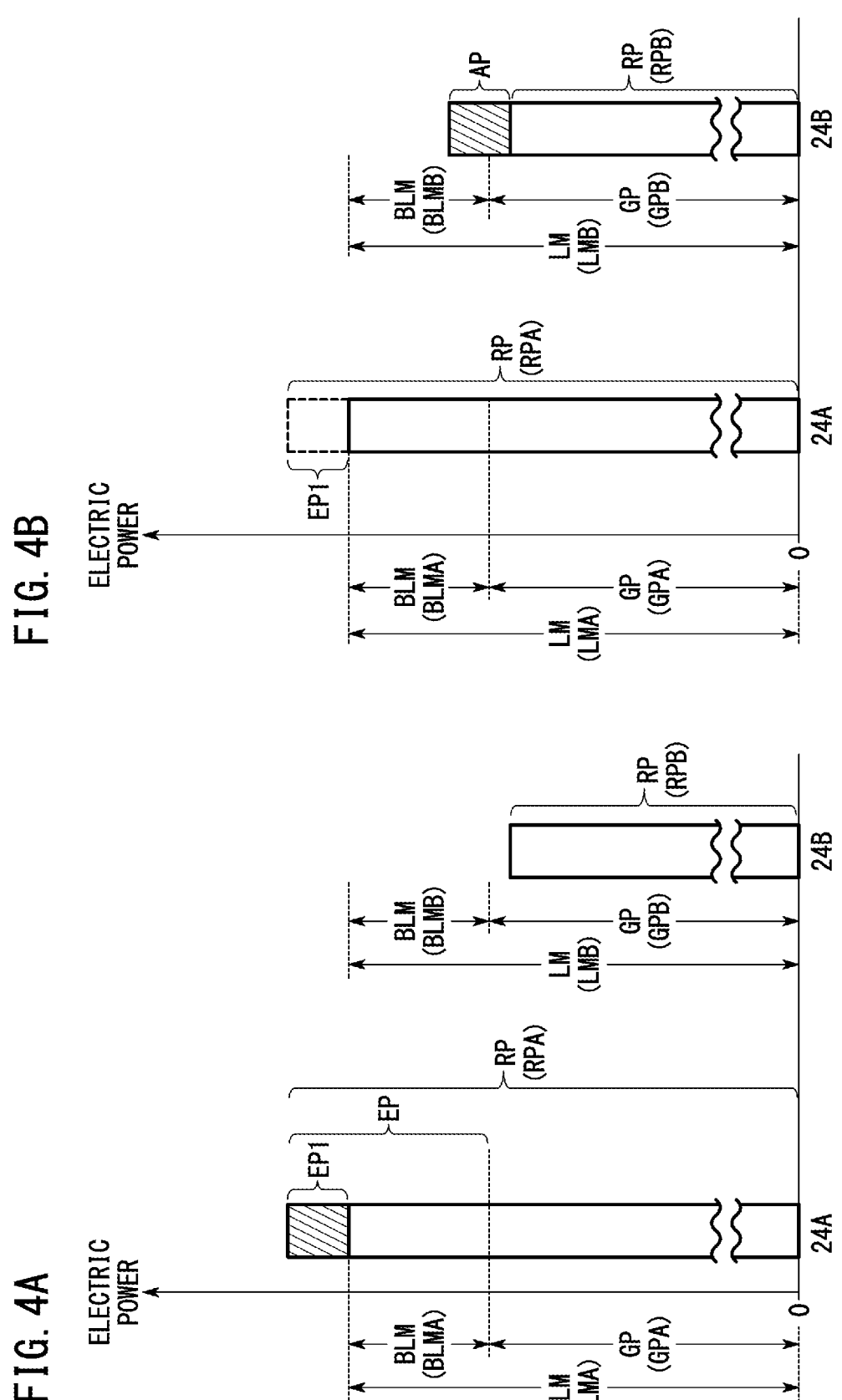
FIG. 4A is a graph schematically showing the magnitude of a requested electric power that each of a plurality of electric power systems is requested to output.
FIG. 4B is a graph schematically showing the magnitude of electric power that can be output from each of the plurality of electric power systems after a power allocation change control is performed.
Figure 5:
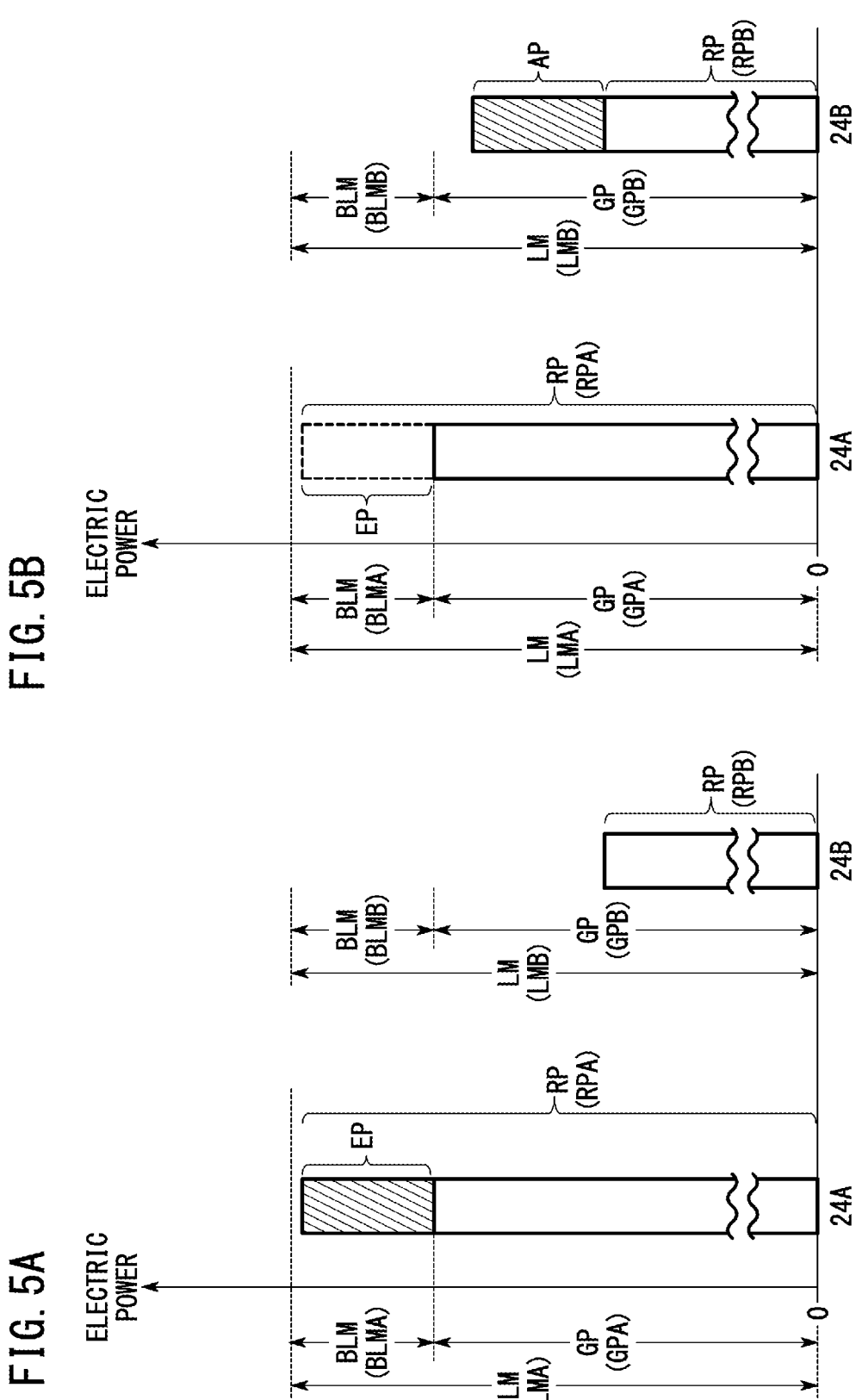
FIG. 5A is a graph schematically showing the magnitude of a requested electric power that each of a plurality of electric power systems is requested to output.
FIG. 5B is a graph schematically showing the magnitude of electric power that can be output from each of the plurality of electric power systems after the power allocation change control is performed.

FIG. 3 is a block diagram showing the control device 48.

The control device 48 is a computer (one or more processing circuits) that controls the electric power system 24. At least a part of the control device 48 may be provided on the PCU 38 described above or may be provided on a flight controller (not shown) for controlling the aerial attitude of the moving object 10 which is an eVTOL (aircraft).

The control device 48 includes a storage unit 50 and a computation unit 52.

The storage unit 50 includes, for example, one or more memories. To be more specific, the storage unit 50 includes, for example, a non-volatile memory such as a random access memory (RAM) and a volatile memory such as a read only memory (ROM) and a flash memory. The non-volatile memory stores, for example, a computer-executable program. The volatile memory temporarily stores, for example, data necessary for a processor (computation unit 52), to be described later, to perform an arithmetic operation based on a program.

The computation unit 52 includes a predetermined processing circuitry. The processing circuitry includes one or more processors such as a central processing unit (CPU), a graphics processing unit (GPU), and the like. At least a part of the processing circuitry may be realized by a predetermined integrated circuit such as an application specific integrated circuit (ASIC), a field-programmable gate array (FPGA), or the like.

The computation unit 52 includes an acquisition unit 54, a control selection unit 62, and a control unit 58. The acquisition unit 54, the control selection unit 62, and the control unit 58 are realized by, for example, the processor of the computation unit 52 executing a program stored in the memory of the storage unit 50. At least a part of the acquisition unit 54, the control selection unit 62, and the control unit 58 may be realized by the integrated circuit or the like described above.

The acquisition unit 54 acquires requested electric power information, output limit value information, and generated power limit value information.

The requested electric power information is information indicating requested electric power RP (see also FIGS. 4A to 5B). The requested electric power RP is power that the electric power system 24 is requested to output. In other words, the requested electric power RP is required electric power that is electric power required by the moving object 10. The requested electric power information (required electric power information) can be grasped based on, for example, information supplied from the flight controller described above. That is, the flight controller includes, for example, a processor, a memory, and the like. The processor of the flight controller outputs an output requirement to the electric power system 24 based on a program stored by the memory of the flight controller. The output requirement indicates, for example, a requested electric power RP required for controlling the aerial attitude of the moving object 10, which is an eVTOL. The acquisition unit 54 can grasp the requested electric power information based on the content of the output requirement output from the flight controller.

A first requested electric power RPA, which is the requested electric power RP that the first electric power system 24A is requested to output, and a second requested electric power RPB, which is the requested electric power RP that the second electric power system 24B is requested to output, may be different from each other. Therefore, the acquisition unit 54 acquires the requested electric power information of each of the plurality of electric power systems 24.

The output limit value information is information indicating an output limit value LM (see also FIGS. 4A to 5B) of the electric power system 24. The output limit value LM is a maximum value of electric power that can be supplied from the electric power system 24 to the electric load 28 without causing damage to the battery 32 included in the electric power system 24. The output limit value LM is the sum of a generated power limit value GP and a battery output limit value BLM, which will be described later. The battery output limit value BLM is a maximum value of electric power that can be supplied from the battery 32 to the electric load 28 without causing damage to the battery 32. For example, when the battery 32 outputs electric power, a voltage drop occurs in the battery 32. When the voltage drop amount at the time of outputting electric power from the battery 32 is excessively large, the battery 32 may be damaged. Therefore, the battery output limit value BLM can be set such that the voltage drop amount does not become excessively large when electric power is output from the battery 32. The battery output limit value BLM differs depending on the remaining battery level (SOC: state of charge) of the battery 32. The battery output limit value BLM increases as the remaining battery level of the battery 32 becomes larger. Whether the voltage drop amount when the electric power is output from the battery 32 is excessive or not can be determined based on, for example, whether the voltage drop amount exceeds a predetermined threshold value.

A first control map indicating a correspondence relationship between the battery output limit value BLM and the remaining battery level of the battery 32 may be stored in the storage unit 50 in advance. The first control map may be created based on, for example, an experiment. The acquisition unit 54 can acquire information indicating the remaining battery level of the battery 32 and specify the battery output limit value BLM corresponding to the remaining battery level of the battery 32, based on the first control map. As described above, the output limit value LM is the sum of the generated power limit value GP and the battery output limit value BLM. The acquisition unit 54 can acquire output limit value information indicating the output limit value LM by adding the generated power limit value GP and the battery output limit value BLM. The information indicating the remaining battery level of the battery 32 can be acquired by using, for example, a sensor (not shown) appropriately provided in the electric power system 24.

The remaining battery levels of the plurality of batteries 32 may be different. Therefore, the battery output limit values BLM of the plurality of batteries 32 may be different. Therefore, the acquisition unit 54 acquires the battery output limit value BLM of each of the plurality of batteries 32. The acquisition unit 54 acquires the output limit value LM of each of the plurality of electric power systems 24.

The generated power limit value information is information indicating the generated power limit value GP (see also FIGS. 4A to 5B). The generated power limit value GP is the maximum value of electric power that can be generated by the power generator 40. In other words, the generated power limit value GP is an upper limit value of electric power that can be output from the power generator 40. There is a correlation between the generated power limit value GP and the output voltage of the power generator 40. For example, the storage unit 50 may store in advance a second control map indicating the relationship between the generated power limit value GP and the terminal voltage (output terminal voltage) of the power generator 40. The acquisition unit 54 can grasp the generated power limit value GP of the power generator 40 based on the information indicating the terminal voltage of the power generator 40 and the second control map. In this way, the acquisition unit 54 can acquire the generated power limit value information indicating the generated power limit value GP of the power generator 40. The information indicating the terminal voltage of the power generator 40 can be acquired by using, for example, a sensor (not shown) appropriately provided in the electric power system 24.

The terminal voltage of the power generator 401 provided in the first electric power system 24A may be different from the terminal voltage of the power generator 402 provided in the second electric power system 24B. That is, the first generated power limit value GPA, which is the generated power limit value GP of the power generator 401 provided in the first electric power system 24A, and the second generated power limit value GPB, which is the generated power limit value GP of the power generator 402 provided in the second electric power system 24B, may be different from each other. Therefore, the acquisition unit 54 acquires the generated power limit value information indicating the generated power limit value GP (GPA, GPB) of each of the plurality of power generators 40.

In the following description, the output limit value LM of the first electric power system 24A is also referred to as a first output limit value LMA. The first output limit value LMA is the sum of a first battery output limit value BLMA, which is the battery output limit value BLM of the battery 321, and a first generated power limit value GPA, which is the generated power limit value GP of the power generator 401 (see also FIGS. 4A to 5B). For the sake of simplicity, the first battery output limit value BLMA in the following description refers to the battery output limit value BLM of the battery 321a unless otherwise specified. In the following description, the output limit value LM of the second electric power system 24B is also referred to as a second output limit value LMB. The second output limit value LMB is the sum of a second battery output limit value BLMB, which is the battery output limit value BLM of the battery 322, and a second generated power limit value GPB, which is the generated power limit value GP of the power generator 402 (see also FIGS. 4A to 5B). For the sake of simplicity, the second battery output limit value BLMB in the following description refers to the battery output limit value BLM of the battery 322a unless otherwise specified.

The control selection unit 62 selects one of a power allocation change control and a requested power output control described below. The control unit 58 executes either one of the power allocation change control and the requested power output control based on the selection result by the control selection unit 62.

(Power Allocation Change Control)

The power allocation change control is control for reducing (suppressing) the electric power output from the first electric power system 24A to be equal to or lower than the first requested electric power RPA and increasing the electric power output from the second electric power system 24B to be higher than the second requested electric power RPB. The description will be given below with reference to FIGS. 4A and 4B.

FIG. 4A is a graph schematically showing the magnitude of a requested electric power RP that each of the plurality of electric power systems 24 is requested to output. The vertical axis of FIG. 4A represents electric power.

When the output power of the battery 321 is expected to exceed the first battery output limit value BLMA, the control selection unit 62 can select the power allocation change control. For example, as shown in FIG. 4A, the first requested electric power RPA for the first electric power system 24A may exceed the first output limit value LMA of the first electric power system 24A. That is, there is a case where the first requested electric power RPA may include an excess power EP, which is an excess over the first generated power limit value GPA of the power generator 401, and the excess power EP may exceed the first battery output limit value BLMA of the battery 321 (FIG. 4A). In such a case, the control selection unit 62 can select the power allocation change control in order to prevent the battery 321 from entering an over-discharge state.

FIG. 4B is a graph schematically showing the magnitude of electric power that can be output from each of the plurality of electric power systems 24 after the power allocation change control is performed. The graph format of FIG. 4B is the same as that of FIG. 4A.

The control unit 58 executes the power allocation change control, whereby the electric power output from the first electric power system 24A is reduced as shown in FIG. 4B. This prevents the battery 321 from entering an over-discharge state. The electric power output from the first electric power system 24A can be reduced to, for example, the first output limit value LMA or less, but is not limited thereto.

Further, as shown in FIG. 4B, the electric power output from the second electric power system 24B becomes the total electric power of the second requested electric power RPB and an additional electric power (additional power) AP by the control unit 58 executing the power allocation change control. The additional electric power AP is additional electric power to be output from the second electric power system 24B in accordance with the output of the first electric power system 24A being reduced.

By increasing the output of the second electric power system 24B as a result of reducing the power of the first electric power system 24A, it is possible to obtain thrust required for the entire moving object 10. That is, when the power allocation change control is executed, the thrust generated by the rotor electric motors 60B to which electric power is supplied from the second electric power system 24B increases. Therefore, even when the output of the first electric power system 24A is reduced, it is possible to achieve the thrust required for the entire moving object 10. In other words, the magnitude of the additional electric power AP shown in FIG. 4B can be determined based on the magnitude of the thrust required for the entire moving object 10. The magnitude of the electric power EP1 that is no longer output from the first electric power system 24A in the power allocation change control may be different from the magnitude of the additional electric power AP that is added to the output of the second electric power system 24B in the power allocation change control.

When it is unfavorable to increase the output of the second electric power system 24B, the control selection unit 62 does not select the power allocation change control.

For example, when the total power of the second requested electric power RPB and the additional electric power AP is expected to exceed the second output limit value LMB of the second electric power system 24B, the control selection unit 62 does not select the power allocation change control. By increasing the output power of the second electric power system 24B within the range of the second output limit value LMB, the battery 322 is prevented from entering an over-discharge state.

The specific control in the power allocation change control is not limited to the above. The description will be given below with reference to FIGS. 5A and 5B.

FIG. 5A is a graph schematically showing the magnitude of the requested electric power RP that each of the plurality of electric power systems 24 is requested to output. The graph format of FIG. 5A is the same as that of FIG. 4A.

For example, as shown in FIG. 5A, the first requested electric power RPA for the first electric power system 24A is less than the first output limit value LMA of the first electric power system 24A, but in excess of the first generated power limit value GPA. The first requested electric power RPA includes excess power EP which is an excess over the first generated power limit value GPA of the power generator 401 (FIG. 5A). If the excess power EP is output from the battery 321, the remaining battery level of the battery 321 decreases. In such a case, the control selection unit 62 can select the power allocation change control in order to suppress a decrease in the remaining battery level of the battery 321.

FIG. 5B is a graph schematically showing the magnitude of electric power that can be output from each of the plurality of electric power systems 24 after the power allocation change control is performed. The graph format of FIG. 5B is the same as that of FIG. 4A.

The control unit 58 executes the power allocation change control, whereby the electric power output from the first electric power system 24A is reduced as shown in FIG. 5B. The electric power output from the first electric power system 24A can be reduced to, for example, the first generated power limit value GPA or less, but is not limited thereto. When the electric power output from the first electric power system 24A is suppressed to be equal to or less than the first generated power limit value GPA, the electric power output from the first electric power system 24A can be entirely covered by the power generator 401. That is, since it is not necessary to output electric power from the battery 321, a decrease in the remaining battery level of the battery 321 is suppressed.

Further, as shown in FIG. 5B, the electric power output from the second electric power system 24B becomes the total electric power of the second requested electric power RPB and the additional electric power AP by the control unit 58 executing the power allocation change control. As in the case where the above-described power allocation change control is executed, by increasing the output of the second electric power system 24B as a result of reducing the power of the first electric power system 24A, it is possible to achieve thrust required for the entire moving object 10.

When it is unfavorable to increase the output of the second electric power system 24B, the control selection unit 62 does not select the power allocation change control.

For example, when the total power of the second requested electric power RPB and the additional electric power AP is expected to exceed the second generated power limit value GPB of the power generator 402, the control selection unit 62 may not select the power allocation change control. In other words, when the total power of the second requested electric power RPB and the additional electric power AP cannot be entirely covered by the power generator 402, the power allocation change control may not be selected. By executing the power allocation change control only when the total electric power of the second requested electric power RPB and the additional electric power AP can be entirely covered by the power generator 402, it is possible to suppress a decrease in the remaining battery level of the battery 322. However, in a case that priority is given to the suppression of decrease in the remaining battery level of the battery 321 while decrease in the remaining battery level of the battery 322 is permitted, the output power of the second electric power system 24B may be increased within the range of the second output limit value LMB.

(Requested Power Output Control)

The requested power output control is control for outputting electric power from the first electric power system 24A, without limitation, based on the first requested electric power RPA and outputting electric power from the second electric power system 24B, without limitation, based on the second requested electric power RPB. The control selection unit 62 can select the requested power output control, for example, when the first requested electric power RPA does not exceed the first generated power limit value GPA and the second requested electric power RPB does not exceed the second generated power limit value GPB, but is not limited thereto. For example, when a predetermined condition, which will be described later, is satisfied, the control selection unit 62 can select the requested power output control even when the first requested electric power RPA exceeds the first generated power limit value GPA or the second requested electric power RPB exceeds the second generated power limit value GPB.

The control selection unit 62 may select one of the two controls described above based on a predetermined order of priority. For example, when a predetermined condition such as an emergency situation is satisfied, it is considered that the attitude control of the moving object 10 should be prioritized. In such a case, the control selection unit 62 may preferentially select the requested power output control. The order of priority may be appropriately designated by the pilot via an operation panel or the like provided in the cockpit.

According to the control device 48 described above, it is possible to prevent the battery 321 from entering an over-discharge state. Further, the control device 48 can suppress decrease in the remaining battery level of the battery 321.

Figure 6:
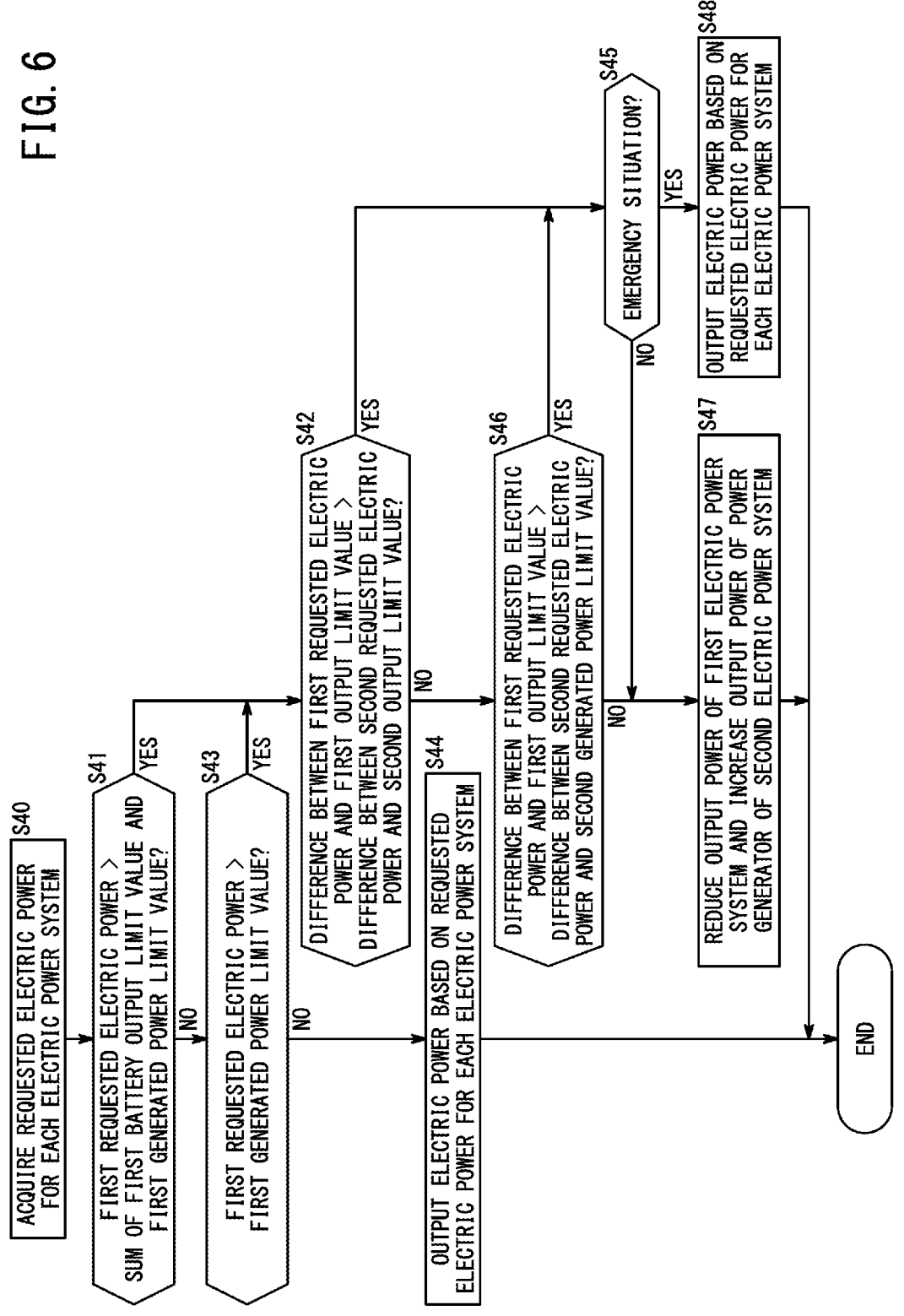
FIG. 6 is a flowchart concretely showing a control method that can be implemented by the control device.

Based on the above description, an example of control that can be realized by the control device 48 will be described. First, as shown in FIG. 6, the requested electric power RP (RPA, RPB) for each of the electric power systems 24 (24A, 24B) is acquired (step S40). The requested electric power RP can be acquired by the acquisition unit 54.

Next, it is determined whether or not the first requested electric power RPA is larger than the sum of the first generated power limit value GPA and the first battery output limit value BLMA (step S41). That is, it is determined whether or not the first requested electric power RPA is larger than the first output limit value LMA. This determination may be made by the control selection unit 62.

When the first requested electric power RPA is larger than the first output limit value LMA (S41: YES), the process proceeds to step S42. When the first requested electric power RPA is equal to or less than the first output limit value LMA (S41: NO), the process proceeds to step S43.

In step S43, it is determined whether or not the first requested electric power RPA is larger than the first generated power limit value GPA. That is, it is determined whether or not the first requested electric power RPA can be covered only by the power generator 401. This determination may be made by the control selection unit 62.

When the first requested electric power RPA is larger than the first generated power limit value GPA (S43: YES), the process proceeds to step S42. When the first requested electric power RPA is equal to or less than the first generated power limit value GPA (S43: NO), the process proceeds to step S44.

In step S44, the above-described requested power output control is executed. That is, since the first requested electric power RPA can be covered only by the power generator 401, the control unit 58 can execute the requested power output control. Thus, each of the electric power systems 24 outputs electric power based on the requested electric power RP.

When the process proceeds to step S42, it is determined whether or not the difference between the first requested electric power RPA and the first output limit value LMA is larger than the difference between the second requested electric power RPB and the second output limit value LMB. This determination may be made by the control selection unit 62.

When the difference between the first requested electric power RPA and the first output limit value LMA is larger than the difference between the second requested electric power RPB and the second output limit value LMB (S42: YES), the process proceeds to step S45. When the difference between the first requested electric power RPA and the first output limit value LMA is equal to or less than the difference between the second requested electric power RPB and the second output limit value LMB (S42: NO), the process proceeds to step S46.

In step S46, it is determined whether or not the difference between the first requested electric power RPA and the first output limit value LMA is larger than the difference between the second requested electric power RPB and the second generated power limit value GPB. This determination may be made by the control selection unit 62.

When the difference between the first requested electric power RPA and the first output limit value LMA is larger than the difference between the second requested electric power RPB and the second generated power limit value GPB (S46: YES), the process proceeds to step S45. If the difference between the first requested electric power RPA and the first output limit value LMA is equal to or less than the difference between the second requested electric power RPB and the second generated power limit value GPB (S46: NO), the process proceeds to step S47.

In step S45, for example, it is determined whether or not it is in an emergency situation. This determination can be made by the control selection unit 62 based on, for example, an instruction from the pilot.

If the determination result is NO in step S45, the process proceeds to step S47. When the determination result is YES in step S45, the process proceeds to step S48.

In step S47, the control unit 58 executes the power allocation change control to reduce the output power of the first electric power system 24A and increase the output power of the power generator 402 of the second electric power system 24B. The output power of the first electric power system 24A is reduced to, for example, the first output limit value LMA or less, but is not limited thereto. For example, when the transition to step S47 is caused by the determination of NO in step S45, electric power may be output from the first electric power system 24A in excess of the first output limit value LMA. As described above, the first output limit value LMA is the sum of the first generated power limit value GPA and the first battery output limit value BLMA.

In step S48, the above-described requested power output control is executed. That is, in a case where there is a situation such as an emergency situation, the control unit 58 may execute the requested power output control. Thus, each of the electric power systems 24 outputs electric power based on the requested electric power RP. Thus, the control method shown in FIG. 6 is put to an end.

According to the present embodiment, when the power allocation change control is performed, the battery 321 can be prevented from entering an over-discharge state. In addition, when the power allocation change control is performed, a decrease in the remaining battery level of the battery 321 can be suppressed. Furthermore, the required thrust can be achieved for the entire moving object 10.

Note that, in the above description, the control in the case where the first requested electric power RPA for the first electric power system 24A exceeds the first output limit value LMA has been described as an example, but the control in the case where the second requested electric power RPB for the second electric power system 24B exceeds the second output limit value LMB can be also described in the same manner as the above.

As described above, in the present embodiment, the first battery output limit value BLMA is the battery output limit value BLM of the battery 321a, and the second battery output limit value BLMB is the battery output limit value BLM of the battery 322a. However, the present invention is not limited to this. The first battery output limit value BLMA may be the sum of the battery output limit value BLM of the battery 321a and the battery output limit value BLM of the battery 321b. The second battery output limit value BLMB may be the sum of the battery output limit value BLM of the battery 322a and the battery output limit value BLM of the battery 322b.

MODIFICATION

The embodiment may be modified as follows. In the following modifications, description overlapping with the description of the embodiment will be omitted. In the drawings referenced in the descriptions of the following modification, the same components as those described in the embodiment are denoted by the same reference numerals.

Figure 7:
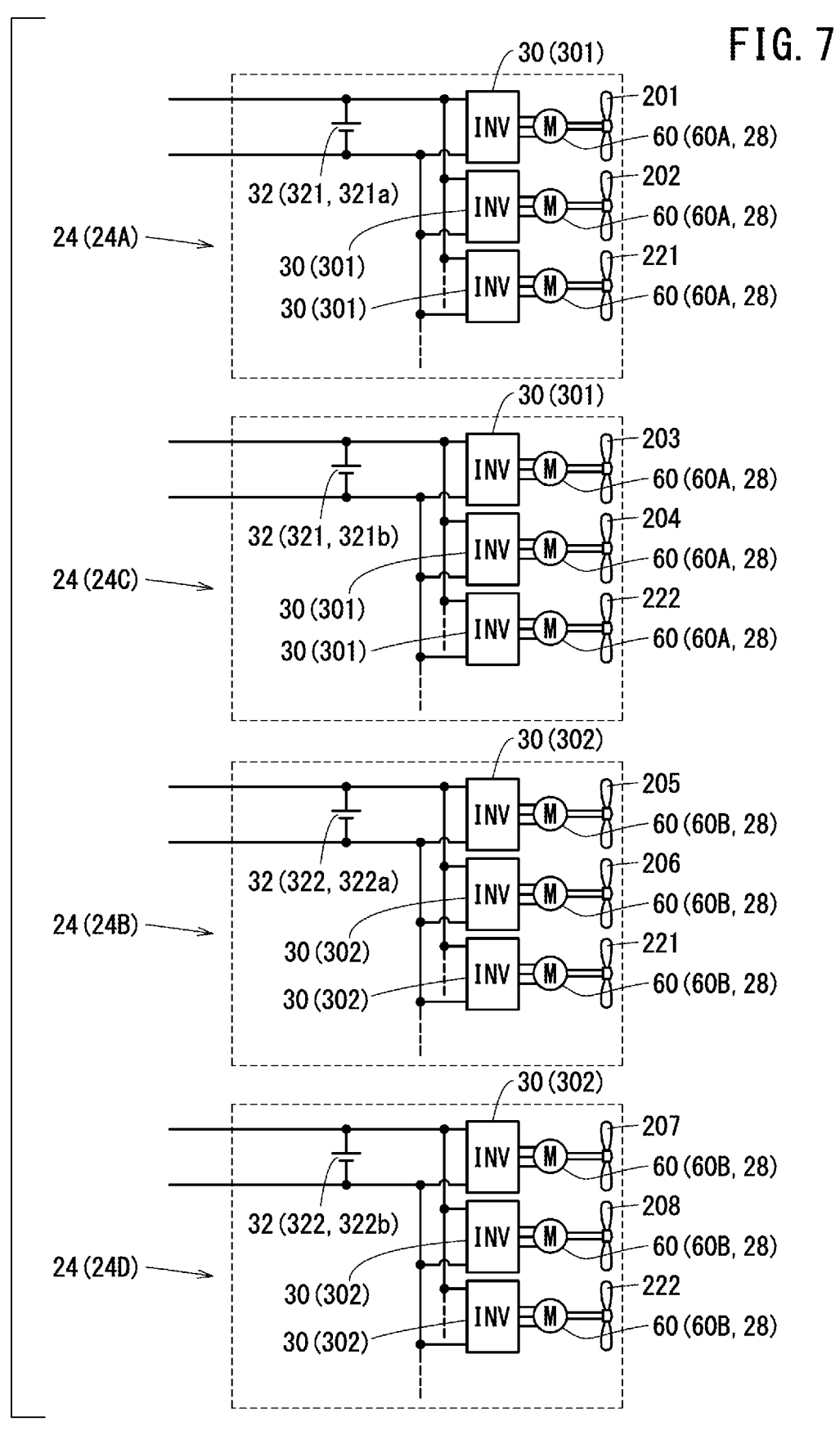
FIG. 7 is a schematic diagram showing a plurality of electric power systems according to a modification.

FIG. 7 is a schematic diagram showing a plurality of electric power systems 24 according to a modification.

The moving object 10 may include a plurality of electric power systems 24 (24A to 24D) illustrated in FIG. 7. The modification differs from the embodiment at least in that the plurality of electric power systems 24 shown in FIG. 7 supply electric power to the electric loads 28 by using only the batteries 32. That is, the modification is different from the embodiment in that the plurality of electric power systems 24 shown in FIG. 7 each do not include the power generator 40 and the switch 36. In such a case, the control device 48 can execute control as described below.

Note that the control described below may be performed on at least two electric power systems among the plurality of electric power systems 24 (24A to 24D). For the sake of simplicity, the following description will be given on a case where the first electric power system 24A and the second electric power system 24B among the plurality of electric power systems 24 shown in FIG. 7 are targets to be controlled.

Figure 8:
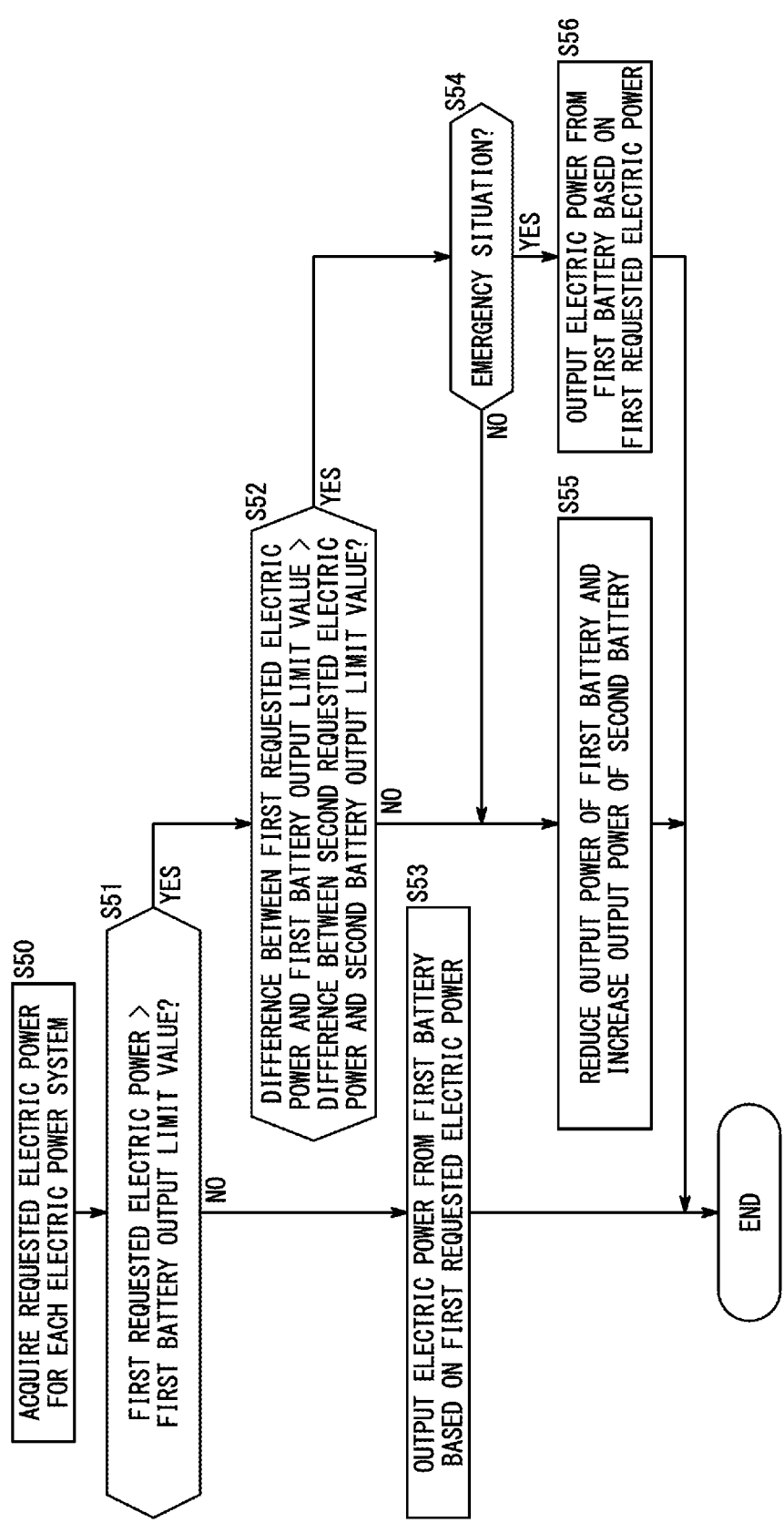
FIG. 8 is a flowchart showing a control method according to a modification.
Figure 9:
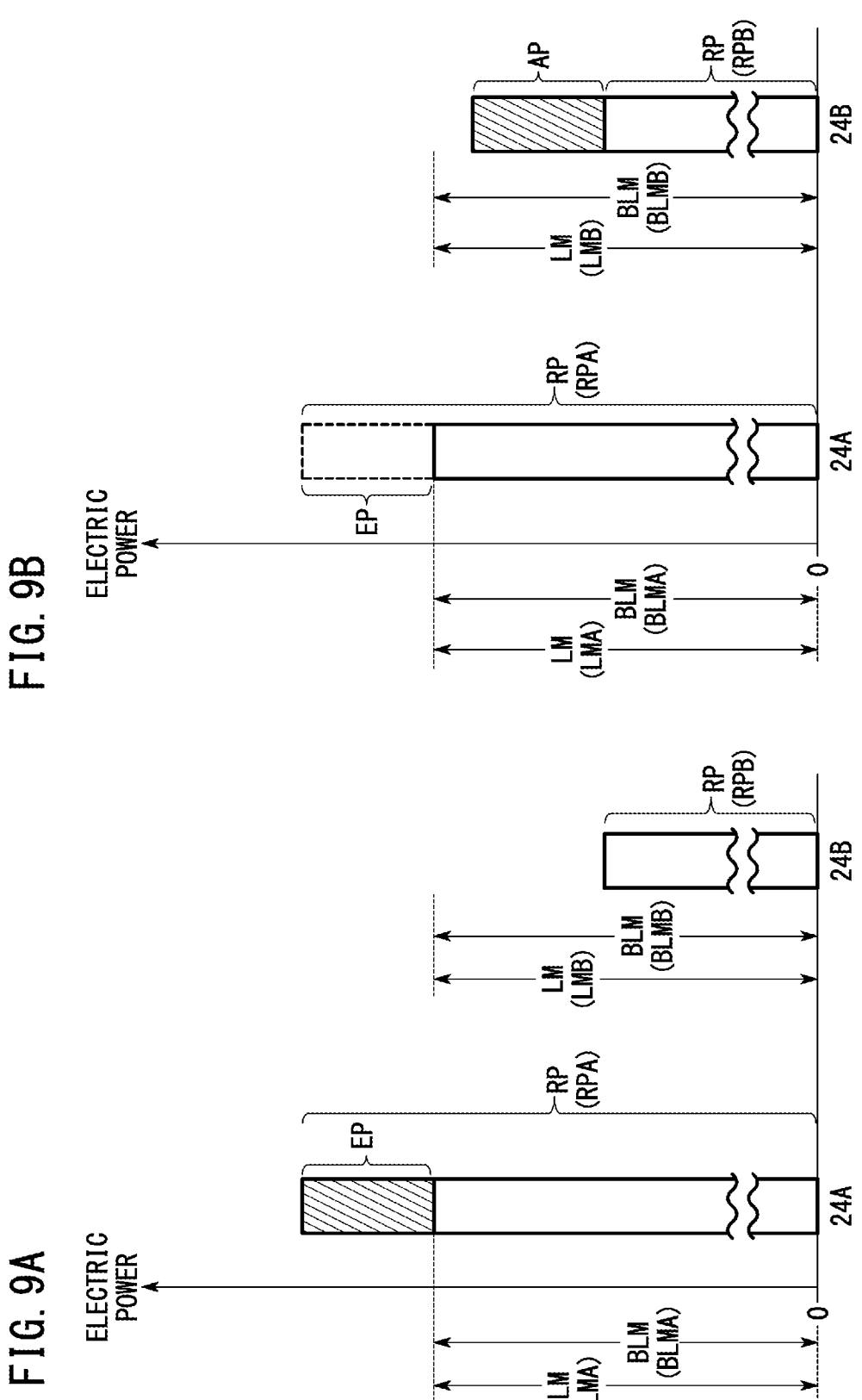
FIG. 9A is a graph schematically showing the magnitude of a requested electric power that each of a plurality of electric power systems is requested to output.
FIG. 9B is a graph schematically showing an example of the magnitude of electric power that can be output from each of the plurality of electric power systems after the power allocation change control is performed.

FIG. 8 is a flowchart showing a control method according to the modification. FIG. 9A is a graph schematically showing the magnitude of a requested electric power that each of the plurality of electric power systems is requested to output. FIG. 9B is a graph schematically showing the magnitude of electric power that can be output from each of the plurality of electric power systems after the power allocation change control is performed.

First, the requested electric power RP for each of the electric power systems 24 may be acquired (step S50). That is, the acquisition unit 54 acquires the first requested electric power RPA for the first electric power system 24A and the second requested electric power RPB for the second electric power system 24B.

In step S50, the first battery output limit value BLMA, which is the battery output limit value BLM of the first battery 321 (321a) provided in the first electric power system 24A, may be further acquired by the acquisition unit 54. In the case of the present modification, the first battery output limit value BLMA may be equivalent to the first output limit value LMA for the first electric power system 24A (see FIG. 9A and FIG. 9B).

In step S50, the acquisition unit 54 may further acquire a second battery output limit value BLMB, which is the battery output limit value BLM of the second battery 322 (322a) included in the second electric power system 24B.

The second battery output limit value BLMB may be equivalent to the second output limit value LMB of the second electric power system 24B (see also FIG. 9A and FIG. 9B).

Next, the process proceeds to step S51, and it is determined whether the first requested electric power RPA is larger than the first battery output limit value BLMA (first output limit value LMA). This determination may be performed by the control selection unit 62.

If the first requested electric power RPA is larger than the first battery output limit value BLMA (S51: YES), the process proceeds to step S52. If the first requested electric power RPA is equal to or less than the first battery output limit value BLMA (S51: NO), the process proceeds to step S53.

In step S53, the control unit 58 performs the requested power output control. Thus, the first electric power system 24A (first battery 321) outputs electric power based on the first requested electric power RPA.

In step S52, it is determined whether or not the difference between the first requested electric power RPA and the first battery output limit value BLMA is larger than the difference between the second requested electric power RPB and the second battery output limit value BLMB. That is, it is determined whether or not the excess electric power (excess power) (EP) over the first battery output limit value BLMA in the first requested electric power RPA is larger than the difference obtained by subtracting the second requested electric power RPB from the second battery output limit value BLMB. This determination may be performed by the control selection unit 62.

When the difference between the first requested electric power RPA and the first battery output limit value BLMA is larger than the difference between the second requested electric power RPB and the second battery output limit value BLMB (S52: YES), the process proceeds to step S54. When the difference between the first requested electric power RPA and the first battery output limit value BLMA is equal to or less than the difference between the second requested electric power RPB and the second battery output limit value BLMB (S52: NO), the process proceeds to step S55.

In step S54, for example, it is determined whether or not it is in an emergency situation. This determination can be made by the control selection unit 62 based on, for example, an instruction from the pilot.

If the determination result is NO in step S54, the process proceeds to step S55. When the determination result is YES in step S54, the process proceeds to step S56.

In step S55, the control unit 58 executes the power allocation change control to reduce the output of the first electric power system 24A (first battery 321a) and increase the output of the second electric power system 24B (second battery 322a). As described above, step S55 may be executed when the difference (EP) between the first requested electric power RPA and the first battery output limit value BLMA is equal to or smaller than the difference between the second requested electric power RPB and the second battery output limit value BLMB. In this case, the excess power (EP) over the first battery output limit value BLMA in the first requested electric power RPA can be covered by increasing the output power of the second electric power system 24B (second battery 322a) by the additional electric power AP (see FIG. 9A and FIG. 9B). Further, even when the difference (EP) between the first requested electric power RPA and the first battery output limit value BLMA is larger than the difference between the second requested electric power RPB and the second battery output limit value BLMB (S52: YES), the step S55 may be executed if a predetermined condition such as an emergency situation is not satisfied (S54: NO). In this case, the second electric power system 24B (second battery 322a) cannot cover the entire excess power EP, but the output of the first electric power system 24A (first battery 321a) can be reduced. By reducing the output of the first battery 321a within a possible range, it is possible to reduce the progress of deterioration of the first battery 321a.

In step S56, the above-described requested power output control is executed. That is, in a case where there is a situation such as an emergency situation, the control unit 58 may execute the requested power output control. Thus, each of the electric power systems 24 outputs electric power based on the requested electric power RP. Thus, the control shown in FIG. 8 is ended.

In this way, even when the electric power system 24 is not provided with the power generator 40, the control device 48 can prevent the battery 32 from entering an over-discharge state.

Figure 10:
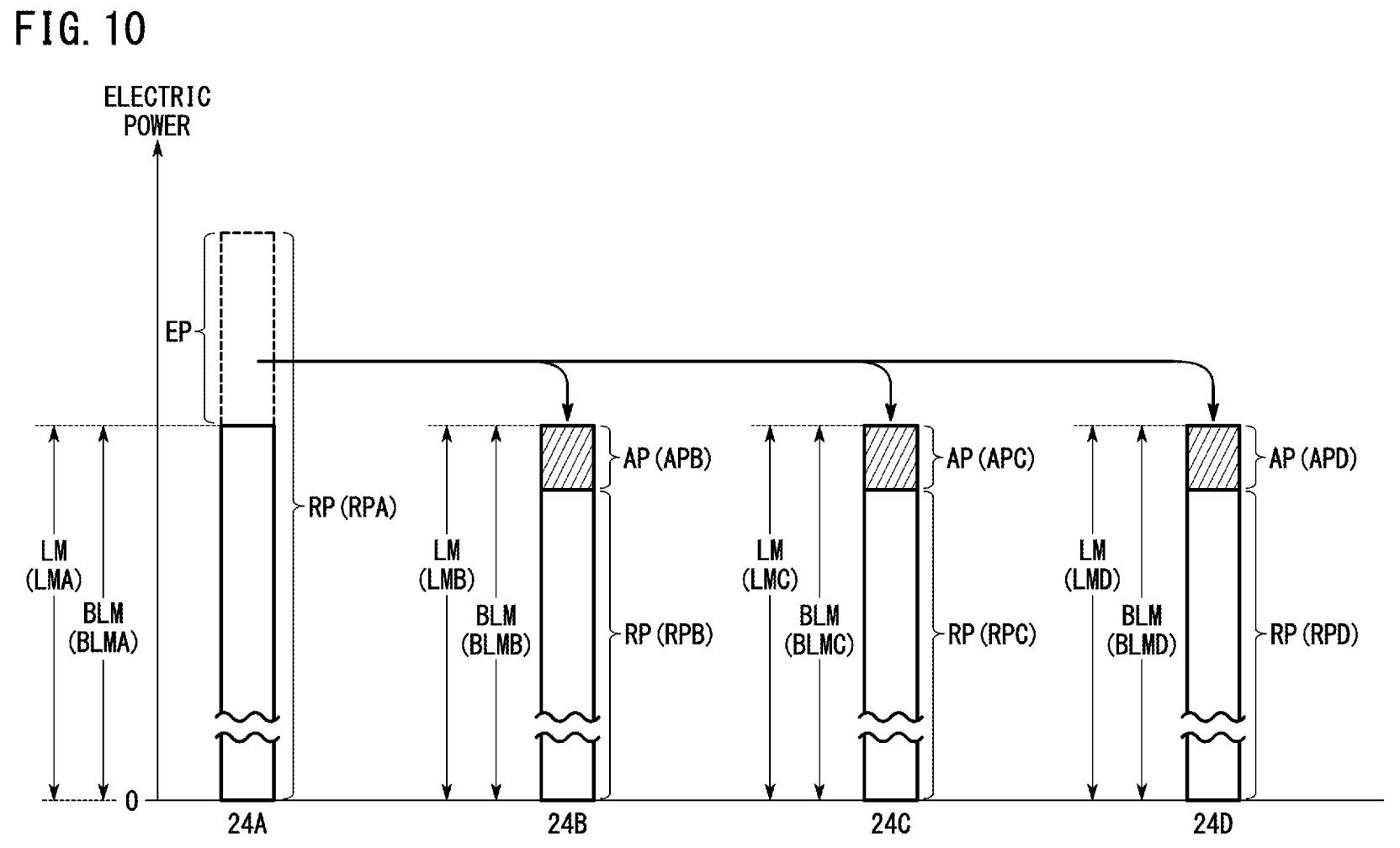

FIG. 10 is a graph schematically showing another example of the magnitude of electric power that can be output from each of the plurality of electric power systems 24 after the power allocation change control is performed.

Based on the above description, a control method including the third electric power system 24C (24) and the fourth electric power system 24D (24) of FIG. 7 will be further described. For example, as shown in FIG. 10, the first requested electric power RPA of the first electric power system 24A includes the excess power EP. In this case, the control unit 58 can reduce the output of the first battery 321a of the first electric power system 24A and increase the output of at least one of the battery 322a of the second electric power system 24B, the battery 321b of the third electric power system 24C, or the battery 322b of the fourth electric power system 24D. In this case as well, the first battery 321a can be prevented from entering an over-discharge state.

The additional power AP (APB) additionally output by the second electric power system 24B (battery 322a), the additional power AP (APC) additionally output by the third electric power system 24C (battery 321b), and the additional power AP (APD) additionally output by the fourth electric power system 24D (battery 322b) may be different from each other.

In this way, when the excess power EP is covered by two or more batteries 32, the determination in step S52 of FIG. 8 can be appropriately modified. This point will be further described.

First, the sum (requested power sum) of the requested electric power RP (RPB, RPC, RPD) for the batteries (321b, 322a, 322b) other than the first battery 321a may be compared with the sum (battery output limit sum) of the battery output limit values BLM of the batteries (321b, 322a, 322b) other than the first battery 321a. That is, it is determined how much electric power can be additionally output by the plurality of batteries (321b, 322a, 322b) other than the first battery 321a. This determination may be made by the control selection unit 62.

Subsequently, it may be determined whether or not the difference (excess power EP) between the first requested electric power RPA and the first battery output limit value BLMA is larger than the difference (battery output limit sum−requested power sum) between the above-described requested power sum and the battery output limit sum. That is, it is determined whether or not electric power corresponding to the excess power EP can be covered by the plurality of batteries (321b, 322a, 322b) other than the first battery 321a. This determination can also be made by the control selection unit 62.

When the difference (excess power EP) between the first requested electric power RPA and the first battery output limit value BLMA is larger than the difference (battery output limit sum–requested power sum) between the above-described requested power sum and the battery output limit sum, the process proceeds to step S54 of FIG. 8. On the other hand, when the excess power EP is equal to or less than the difference (battery output limit sum-requested power sum) between the above-described requested power sum and the battery output limit sum, the process proceeds to step S55 in FIG. 8. As a result, in step S55, the electric power output from each electric power system 24 can be adjusted as described above (FIG. 10).

In this way, when the number of batteries 32 is three or more, the excess power EP of one battery 32 (321a) can be covered by one or more other batteries 32 (321b, 322a, 322b). As a result, the battery 321a can be prevented from entering an over-discharge state.

The mode of the electric power control that can be realized by the control device 48 is not limited to the above description. In this regard, some examples will be further described with reference to FIGS. 11 to 13.

Figure 11:
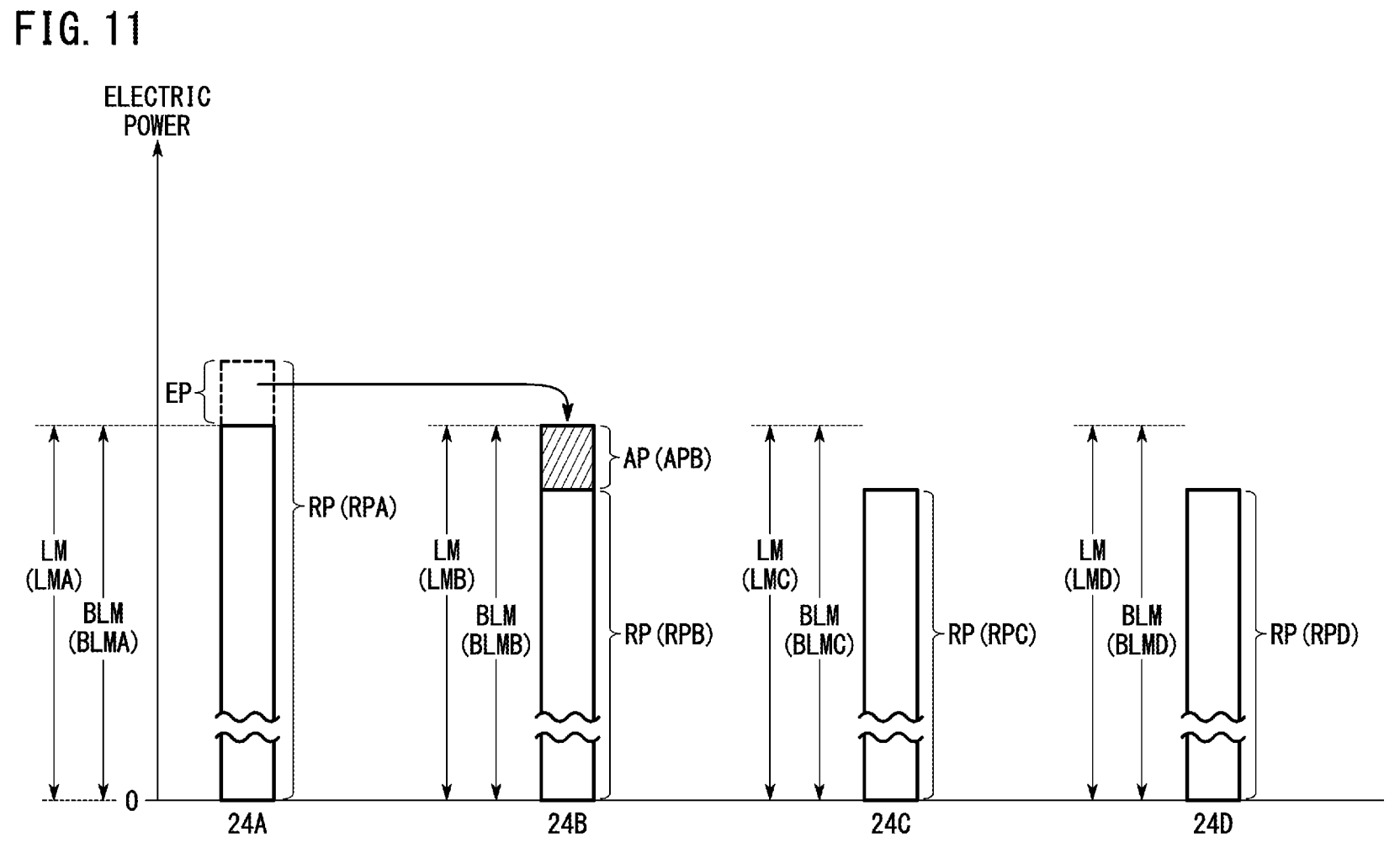
Figure 12:
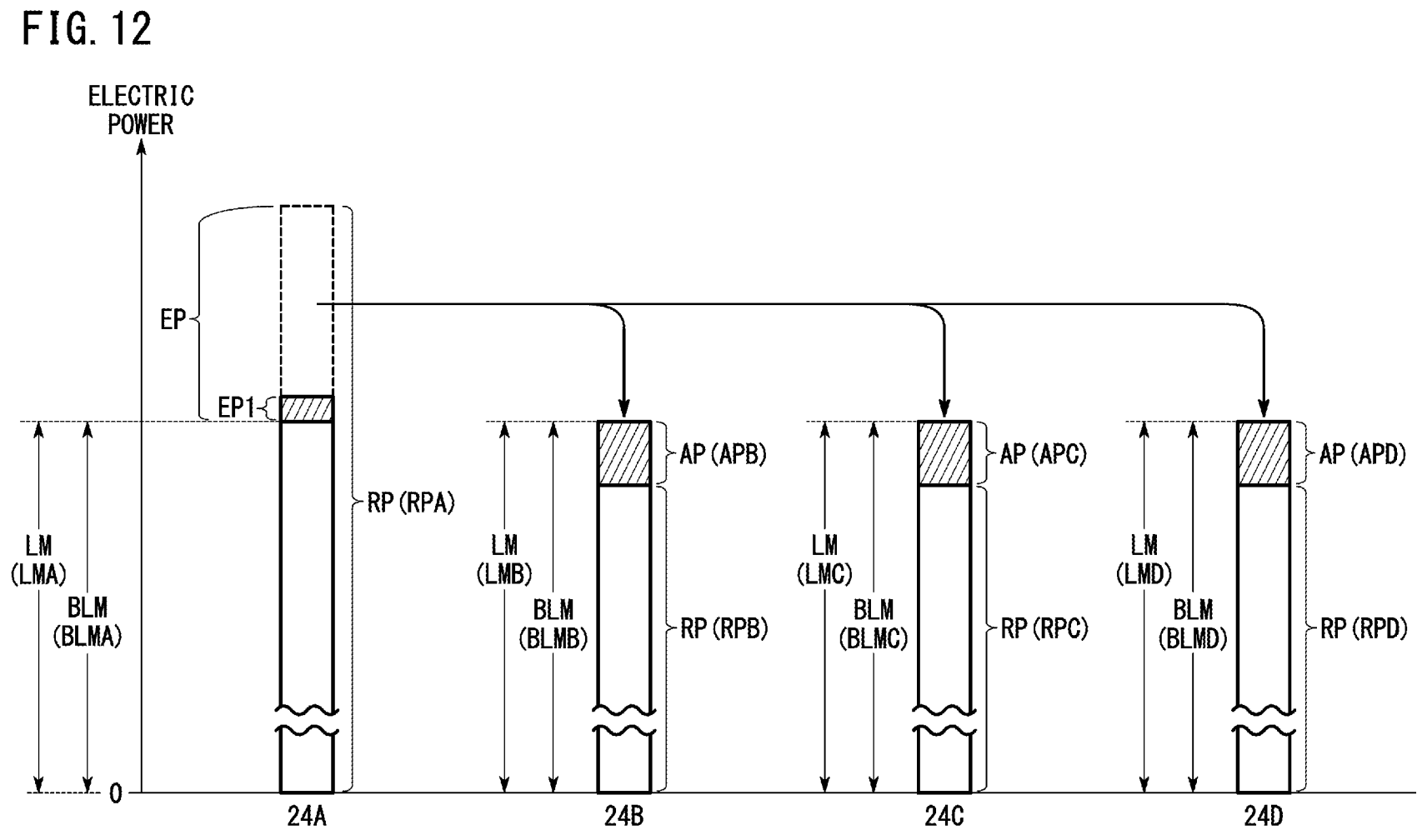
Figure 13:
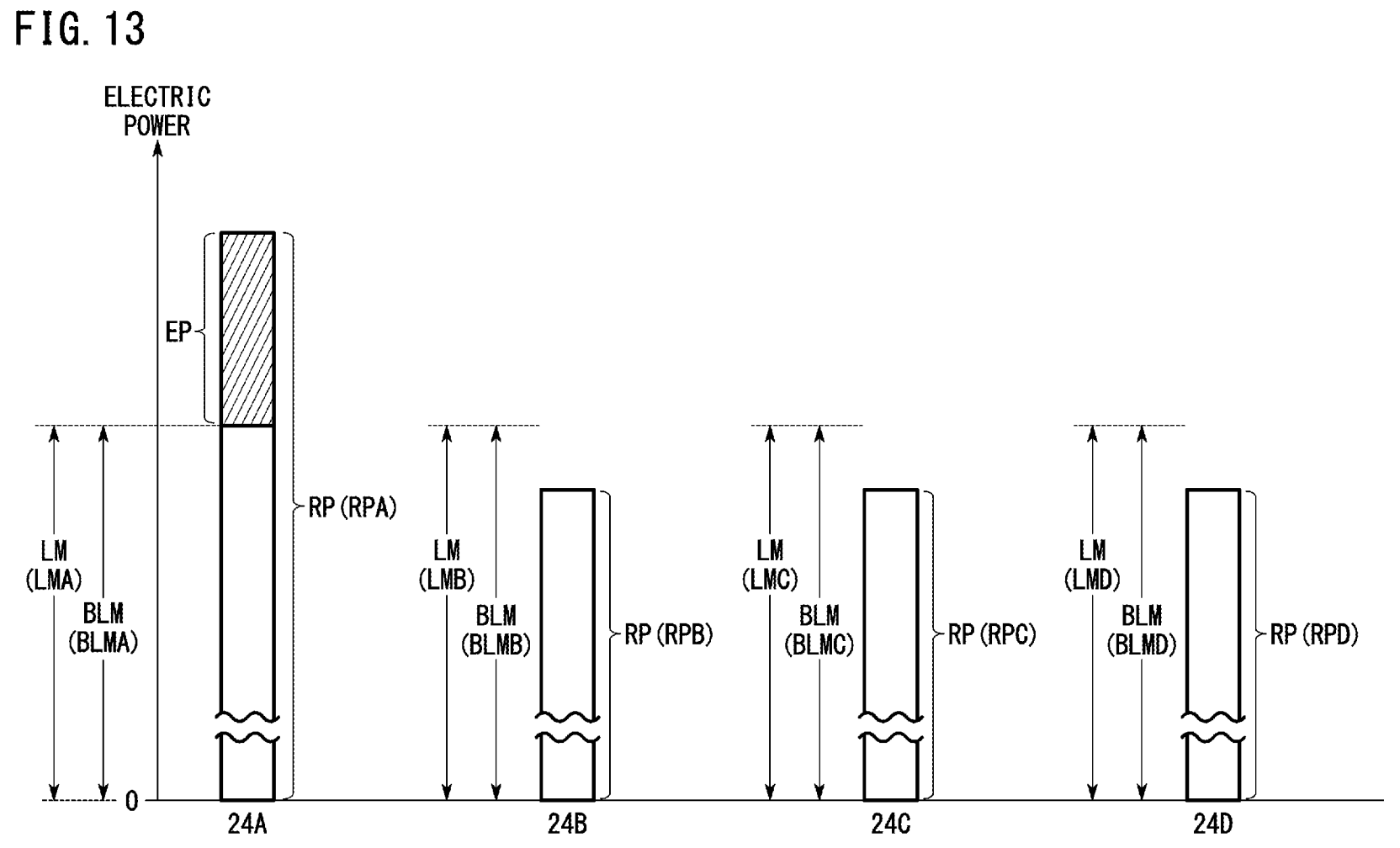

FIGS. 11 to 13 are graphs schematically showing other examples of the magnitude of electric power that can be output from each of the plurality of electric power systems 24 according to the modification.

For example, in the above-described step S55, as shown in FIG. 11, there is a case where each of the second electric power system 24B (battery 322a), the third electric power system 24C (battery 321b), and the fourth electric power system 24D (battery 322b) can output the additional power AP. In this case, the control unit 58 may cause only one or two of the second electric power system 24B, the third electric power system 24C, and the fourth electric power system 24D to output the additional power AP. In the example of FIG. 11, each of the third electric power system 24C and the fourth electric power system 24D has enough ability to output the additional power AP, but the additional power AP is covered only by the second electric power system 24B.

Further, after the determination result is YES in step S52 of FIG. 8, the determination result in step S54 may be NO, and thus the process may proceed to step S55. In this case, even if each of the second electric power system 24B (battery 322a), the third electric power system 24C (battery 321b), and the fourth electric power system 24D (battery 322b) outputs the additional power AP, the excess power EP of the first electric power system 24A (battery 321a) cannot be covered. That is, there is a case where a part (EP1) of the excess power EP cannot be covered by the electric power systems 24 (batteries 32) other than the first electric power system 24A (battery 321a). Even in such a case, as shown in FIG. 12, the control unit 58 increases the output of each of the second electric power system 24B (battery 322a), the third electric power system 24C (battery 321b), and the fourth electric power system 24D (battery 322b), and reduces the output of the first electric power system 24A (battery 321a) within a possible range. This can retard the progress of deterioration of the battery 321a. Furthermore, the required thrust can be achieved for the entire moving object 10.

Further, when it is determined in step S54 of FIG. 8 that the predetermined condition such as an emergency situation is satisfied (S54: YES), the process proceeds to step S56 as described above. In step S56, as shown in FIG. 13, even if each of the second electric power system 24B (battery 322a), the third electric power system 24C (battery 321a), and the fourth electric power system 24D (battery 322b) can output the additional power AP, the electric power based on the first requested electric power RPA may be output from the first electric power system 24A (battery 321a) without limitation. Thus, for example, in the case of an emergency situation, the attitude control of the moving object 10 can be executed with favorable accuracy.

In this way, the control device 48 can selectively execute various kinds of electric power control depending on the situation.

The following Supplementary Notes are further disclosed in relation to the above embodiment.

Supplementary Note 1

The control device (48) according to the present disclosure controls the moving object (10) provided with the plurality of electric power systems (24) that supply electric power to the plurality of electric loads (28) including at least one motor (60) that drives the thrust device (18) that generates thrust for the moving object. The plurality of electric power systems include the batteries (32) respectively. The plurality of electric power systems include the first electric power system (24A), the first electric power system including the first battery (321), which is one of the batteries, the first battery being configured to supply electric power to the first electric load including the motor that belongs to the first group, the first electric load being one of the electric loads. The control device includes the acquisition unit (54) configured to acquire information indicating the battery output limit value (BLM) that is the maximum value of electric power that can be supplied from each of the batteries to the electric loads; and the control unit (58) configured to, when electric power supplied from the first battery to the first electric load is expected to exceed the first battery output limit value (BLMA), which is the battery output limit value of the first battery, execute control of increasing electric power supplied from the battery other than the first battery to the electric load other than the first electric load, within a range not exceeding the battery output limit value of the battery other than the first battery, and reducing the electric power supplied from the first battery to the first electric load. This can prevent the battery from entering an over-discharge state, and also can prevent the battery from being damaged. That is, a control device capable of performing electric power control suitably is provided.

Supplementary Note 2

In the control device according to Supplementary Note 1, each of the electric power systems may include the power generator (40) configured to be driven by the internal combustion engine (44) and supply electric power to the electric loads, the plurality of electric power systems may include the second electric power system (24B), the second electric power system being configured to supply electric power to the second electric load including the motor that belongs to the second group different from the first group, the second electric load being one of the electric loads, and the acquisition unit may further acquire information indicating the generated power limit value (GP) that is the maximum value of electric power that can be generated by the power generator; and when electric power supplied from the first electric power system to the first electric load is expected to exceed the first generated power limit value (GPA), which is the generated power limit value of the power generator provided in the first electric power system, and the control unit may execute control of increasing the electric power supplied from the second electric power system to the second electric load within the range not exceeding the second generated power limit value, which is the generated power limit value of the power generator provided in the second electric power system, and reducing the electric power supplied from the first electric power system to the first electric load to be equal to or less than the first generated power limit value of the power generator provided in the first electric power system. This can prevent the remaining battery level of the battery from decreasing. That is, a control device capable of performing electric power control suitably is provided.

Supplementary Note 3

In the control device according to Supplementary Note 1, each of the electric power systems may include the power generator (40) configured to be driven by the internal combustion engine (44) and supply electric power to the electric loads, the plurality of electric power systems may include the second electric power system (24B), the second electric power system being configured to supply electric power to the second electric load including the motor that belongs to the second group different from the first group, the second electric load being one of the electric loads, and the acquisition unit may further acquire information indicating the generated power limit value (GP) that is the maximum value of electric power that can be generated by the power generator and further acquire information indicating the output limit value (LM) that is the maximum value of electric power that can be supplied from each of the electric power systems to the electric loads; and when electric power supplied from the first electric power system to the first electric load is expected to exceed the first output limit value (LMA), which is the output limit value of the first electric power system, the control unit may execute control of increasing the electric power supplied from the second electric power system to the second electric load within the range not exceeding the output limit value of the second electric power system, and reducing the electric power supplied from the first electric power system to the first electric load to be equal to or less than the first output limit value, the first output limit value may be the sum of the first battery output limit value and the first generated power limit value (GPA) that is the generated power limit value of the power generator included in the first electric power system, and the output limit value of the second electric power system may be the sum of the battery output limit value of the battery included in the second electric power system and the second generated power limit value (GPB) that is the generated power limit value of the power generator included in the second electric power system. With this configuration, when the electric power system includes both the battery and the power generator, the battery can be prevented from being brought into an over-discharge state, and the battery can be prevented from being damaged.

Supplementary Note 4

In the control device according to any one of Supplementary Notes 1 to 3, when a predetermined condition is satisfied, the control unit may preferentially perform supply of electric power based on requested electric power (RP) which is requested to be supplied. The predetermined condition is, for example, a case where there is a situation such as an emergency. Thus, for example, the attitude control and the electric power supply control of the moving object can be selectively executed according to the flight state of the moving object. As a result, the safety of the moving object can be improved.

Supplementary Note 5

A moving object (10) according to the present disclosure includes the control device according to any one of Supplementary Notes 1 to 4. Thus, the moving object capable of performing the electric power control in a favorable manner is provided.

Supplementary Note 6

The control method according to the present disclosure controls the moving object (10) provided with the plurality of electric power systems (24) that supply electric power to the plurality of electric loads (28) including at least one motor (60) that drives the thrust device (18) that generates thrust for the moving object. The plurality of electric power systems include the batteries (32) respectively. The plurality of electric power systems include the first electric power system (24A), the first electric power system including the first battery (321), which is one of the batteries, the first battery being configured to supply electric power to the first electric load including the motor that belongs to the first group, the first electric load being one of the electric loads. The control method includes: the step (S40, S50) of acquiring information indicating the battery output limit value (BLM) that is the maximum value of electric power that can be supplied from each of the batteries to the electric loads; and the step (S55) of, when electric power supplied from the first battery to the first electric load is expected to exceed the first battery output limit value (BLMA), which is the battery output limit value of the first battery, executing control of increasing electric power supplied from the battery other than the first battery to the electric load other than the first electric load, within the range not exceeding the battery output limit value of the battery other than the first battery, and reducing the electric power supplied from the first battery to the first electric load. This can prevent the battery from entering an over-discharge state, and also can prevent the battery from being damaged. That is, a control method capable of performing electric power control suitably is provided.

Moreover, it should be noted that the present invention is not limited to the disclosure described above, but various configurations may be adopted therein without departing from the essence and gist of the present invention.

The invention claimed is:

1. A moving object comprising:
   a plurality of electric power systems that supply electric power to a plurality of electric loads including at least one motor that drives a thrust device that generates thrust for the moving object; and
   a control device, wherein
   the plurality of electric power systems include batteries respectively,
   the plurality of electric power systems comprise a first electric power system, the first electric power system including a first battery which is one of the batteries, the first battery being configured to supply electric power to a first electric load including the motor that belongs to a first group, the first electric load being one of the electric loads,
   the control device comprises one or more processors that execute computer-executable instructions stored in a memory, wherein the one or more processors execute the computer-executable instructions to cause the control device to:
   acquire information indicating a battery output limit value that is a maximum value of electric power that is suppliable from each of the batteries to the electric loads; and when electric power supplied from the first battery to the first electric load based on requested electric power from the first electric power system would exceed a first battery output limit value which is the battery output limit value of the first battery, execute control of increasing electric power supplied from an other battery, the other battery being one of the batteries other than the first battery, to an other electric load, the other electric load being one of the electric loads other than the first electric load, within a range not exceeding the battery output limit value of the other battery, and reducing the electric power supplied from the first battery to the first electric load.

2. The moving object according to claim 1, wherein each of the electric power systems includes a power generator configured to be driven by an internal combustion engine and supply electric power to the electric loads, the plurality of electric power systems comprise a second electric power system, the second electric power system being configured to supply electric power to a second electric load including a motor, of the at least one motor, that belongs to a second group different from the first group, the second electric load being one of the electric loads, and the one or more processors cause the control device to:
  further acquire information indicating a generated power limit value that is a maximum value of electric power that is generatable by the power generator; and
  when electric power supplied from the first electric power system to the first electric load based on requested electric power from the first electric power system would exceed a first generated power limit value which is the generated power limit value of the power generator provided in the first electric power system, execute control of increasing the electric power supplied from the second electric power system to the second electric load within a range not exceeding a second generated power limit value, which is the generated power limit value of the power generator provided in the second electric power system, and reducing the electric power supplied from the first electric power system to the first electric load to be equal to or less than the first generated power limit value of the power generator provided in the first electric power system.

3. The moving object according to claim 1, wherein each of the electric power systems includes a power generator configured to be driven by an internal combustion engine and supply electric power to the electric loads, the plurality of electric power systems comprise a second electric power system, the second electric power system being configured to supply electric power to a second electric load including a motor, of the at least one motor, that belongs to a second group different from the first group, the second electric load being one of the electric loads, and the one or more processors cause the control device to:
further acquire information indicating a generated power limit value that is a maximum value of electric power that is generatable by the power generator;

further acquire information indicating an output limit value that is a maximum value of electric power that is suppliable from each of the electric power systems to the electric loads; and when electric power supplied from the first electric power system to the first electric load based on requested electric power from the first electric power system would exceed a first output limit value, which is the output limit value of the first electric power system, execute control of increasing the electric power supplied from the second electric power system to the second electric load within a range not exceeding the output limit value of the second electric power system, and reducing the electric power supplied from the first electric power system to the first electric load to be equal to or less than the first output limit value, the first output limit value is a sum of the first battery output limit value and a first generated power limit value that is the generated power limit value of the power generator provided in the first electric power system, and the output limit value of the second electric power system is a sum of the battery output limit value of a battery, of the batteries, that is provided in the second electric power system and a second generated power limit value that is the generated power limit value of the power generator provided in the second electric power system.

4. The moving object according to claim 1, wherein the one or more processors cause the control device to:
  when it is determined that an emergency situation exists, preferentially perform supply of electric power that is based on requested electric power which is requested to be supplied.

5. A control method for controlling a moving object provided with a plurality of electric power systems that supply electric power to a plurality of electric loads including at least one motor that drives a thrust device that generates thrust for the moving object, wherein
  the plurality of electric power systems include batteries respectively, and
  the plurality of electric power systems comprise a first electric power system, the first electric power system including a first battery which is one of the batteries, the first battery being configured to supply electric power to a first electric load including the motor that belongs to a first group, the first electric load being one of the electric loads,
  the control method comprising:
  acquiring information indicating a battery output limit value that is a maximum value of electric power that is suppliable from each of the batteries to the electric loads; and
  when electric power supplied from the first battery to the first electric load based on requested electric power from the first electric power system would exceed a first battery output limit value which is the battery output limit value of the first battery, executing control of increasing electric power supplied from an other battery, the other battery being one of the batteries other than the first battery, to an other electric load, the other electric load being one of the electric loads other than the first electric load, within a range not exceeding the battery output limit value of the other battery, and reducing the electric power supplied from the first battery to the first electric load.

23

6. A moving object comprising:

a plurality of electric power systems that supply electric power to a plurality of electric loads including at least one motor that drives a thrust device that generates thrust for the moving object; and a control device, wherein a correspondence relationship between the plurality of electric power systems and the plurality of electric loads is determined in advance in a manner so that electric power is supplied from each of the plurality of electric power systems to a different group of electric loads, the plurality of electric power systems include batteries respectively, the plurality of electric power systems comprise a first electric power system, the first electric power system including a first battery which is one of the batteries, the first battery being configured to supply electric power to a first electric load including the motor that belongs to a first group, the first electric load being one of the electric loads, the control device comprises one or more processors that execute computer-executable instructions stored in a memory, wherein the one or more processors execute the computer-executable instructions to cause the control device to:

acquire information indicating a battery output limit value that is a maximum value of electric power that is suppliable from each of the batteries to the electric loads; and when electric power supplied from the first battery to the first electric load based on requested electric power from the first electric power system would exceed a first battery output limit value which is the battery output limit value of the first battery, execute control of increasing electric power supplied from an other battery, the other battery being one of the batteries other than the first battery, to an other electric load, the other electric load being one of the electric loads other than the first electric load, within a range not exceeding the battery output limit value of the other battery, and reducing the electric power supplied from the first battery to the first electric load.

* * * * *